Figure 1:
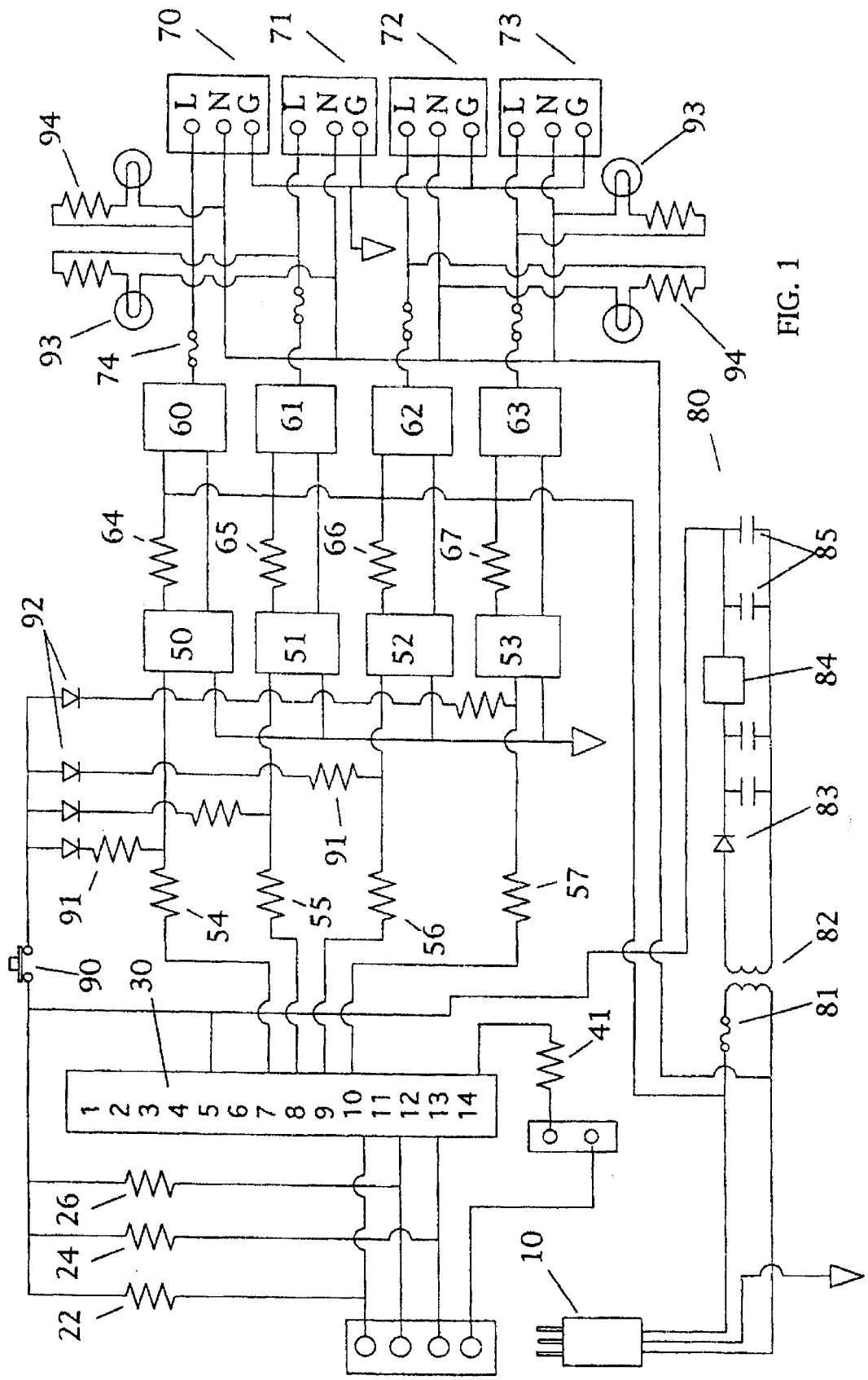

United States Patent
Holman

[11] Patent Number: 5,883,445
[45] Date of Patent: Mar. 16, 1999

[54] POWER SHARING DEVICE

[76] Inventor: Frank T. Holman, 4013-41 Ave., Red Deer, Canada, T4N 2X9

[21] Appl. No.: 731,878

[22] Filed: Oct. 22, 1996

[51] Int. Cl.⁶ ...................................................... H02J 3/14
[52] U.S. Cl. ................................ 307/38; 307/31; 307/38; 307/41; 307/139; 307/140; 307/141; 323/267
[58] Field of Search ............................... 307/38, 3.1, 19, 307/41, 139, 140, 141; 323/267, 272

[56] References Cited

U.S. PATENT DOCUMENTS

| | | | |
|---|---|---|---|
| 3,881,114 | 4/1975 | Ferrari | 307/41 |
| 3,987,430 | 10/1976 | Saarem | 340/309 |
| 4,177,388 | 12/1979 | Lingenfelter | 307/38 |
| 4,215,277 | 7/1980 | Weiner | 307/41 |
| 4,315,161 | 2/1982 | Bailey | 307/31 |
| 4,446,359 | 5/1984 | Arribes | 219/485 |
| 4,520,274 | 5/1985 | Stants | 307/39 |
| 4,724,374 | 2/1988 | Beg | 323/272 |
| 4,777,379 | 10/1988 | Young | 307/41 |
| 5,227,666 | 7/1993 | Asprey | 307/44 |
| 5,266,838 | 11/1993 | Gerner | 307/19 |
| 5,278,771 | 1/1994 | Nyenya | 364/492 |
| 5,300,864 | 4/1994 | Allen, Jr. | 315/314 |
| 5,384,490 | 1/1995 | Swartz | 307/38 |
| 5,498,907 | 3/1996 | Tumpey et al. | 257/724 |

Primary Examiner—William M. Shoop, Jr.
Assistant Examiner—Albert W. Paladini
Attorney, Agent, or Firm—David S. Thompson

[57] ABSTRACT

A power sharing device is disclosed, having a primary utility in supplying power to automotive block heaters or other auto warming devices at a user selectable duty cycle of 12.5% or 25%. In a first mode, power is supplied to 4 outlets in a sequential manner, for 15 minutes each. In a second mode, power is supplied to the 4 outlets in a sequential manner, for 7.5 minutes each, followed by a period of 7.5 minutes in which power is not supplied. The user may elect to initiate a delay period, that is selectable between 1 and 2 hours, to precede the sequence of power distribution, allowing time for the car to cool before the power cycles begin. A test circuit, activated by a pushbutton, allows a user to distinguish between the periods of time when power is not being supplied to an outlet as a part of the sequential sharing of power between outlets and a circuit malfunction, such as a blown fuse.

7 Claims, 2 Drawing Sheets

POWER SHARING DEVICE

CROSS-REFERENCES

There are no applications related to this application filed in this or any foreign country.

BACKGROUND

It is well-known in northern climates to use automotive block heaters during the winter months. Such heaters maintain the engine block and oil temperatures well above the ambient temperatures. Similar heaters are available for automotive radiators and batteries.

Unfortunately, since such equipment must be manufactured to stand up under the most extreme weather conditions, it is often the case that excessive power is consumed under standard or milder conditions. This is true not only of automotive block, radiator and battery heaters, but also heaters used in animal husbandry, such as those used to prevent the drinking water of livestock from freezing. As a result, money is wasted in operation during all but the most extreme weather conditions.

As a result, power sharing devices have been developed to cycle power to one or more outlets, thereby lessening the duty cycle of an individual heating apparatus from 100% to some fraction thereof. However, due to their construction, most such power cycling devices lack the functionality required to be fully effective in supplying the amount of power required for the efficient operation of the heating device.

A first flaw common to most power sharing and cycling devices it that the power supply commences at the moment the heating devices are plugged in. As a result, electrical power is expended heating a warm engine.

A second flaw common to many power sharing devices is the use of mechanical construction techniques that result in a high parts count and failure rate, component degradation over time and high cost of manufacture.

An additional flaw common to power sharing devices is that when power is in the off portion of the cycle there is no method and supporting circuit that allows the user to determine if the power is simply in the off portion of the cycle, or if there has been a circuit failure.

A still further flaw common to most power sharing devices is that the user has little or no control over the duty cycle of the power distribution.

For the foregoing reasons, there is a need for power sharing device that can, at the user's option, delay the inception of the operation of the heating device. The power sharing device must be able to function in any ambient temperature, and must be extremely reliable. The power sharing device must provide the user with control over the power duty cycle at which the heating devices are operated. Also, the power sharing device must provide the user with circuitry to test all outlets to determine if power is being supplied and to determine if there is a circuit failure.

SUMMARY

The present invention is directed to an apparatus that satisfies the above needs. A novel power sharing device is provided that provides means which delay the time of activation until after the car's engine has had time to cool, provides an extremely reliable structure and gives the user unprecedented control over the power provided to the controlled device.

The power sharing device of the present invention provides some or all of the following structures.

(a) A power cord, adapted to be inserted into a standard electrical outlet, providing "hot" or "line", "neutral" and "ground" 120 volt, 60 cycle ac current conductors.

(b) A delay period choice switch for allowing the user to select a delay period, typically either 1 or 2 hours, before the power cycles commence.

(c) A power cycle choice switch for allowing the selection of a power cycle period, typically of 7.5 or 15 minutes per hour.

(d) A delay pushbutton switch for causing the above switches to be read to determine the delay period and the power cycle period, and to start the appropriate delay period followed by the appropriate power cycle periods.

(e) An LED for indicating that the delay period is in progress.

(f) A microcontroller or similar digital processor, having at least 3 input and 5 output lines. The three input lines are connected to the delay period choice switch, the power cycle choice switch and the delay pushbutton switch. Four of the five output lines are connected to circuitry, discussed below, for controlling four time-shared electrical outlets. The fifth output line is connected to the above mentioned LED indicator.

(g) Computer software, controlling the operation of the microcontroller, for upon power being applied to the microcontroller checking to see the status of the power cycle choice switch and for beginning to sequentially apply power to each of the four outlets in either a first or a second power cycle. If the power cycle choice switch was set to a first position, then each of the four output lines is activated, in an endless sequence and one at a time, for a period of 15 minutes. If the power cycle choice switch was set to a second position, then the software causes the microcontroller to activate each output line, in an endless sequence and one at a time, for 7.5 minutes. A software delay follows each activation with a 7.5 minute pause in which no output line is activated. The software continuously polls the port to determine if the delay pushbutton switch has been pushed. If the delay pushbutton switch is pushed, depending on the setting of the delay period switch, the software executes either a one or a two hour delay. Following the delay, the microcontroller then resumes the appropriate power cycle.

(h) Four optoisolator devices, each device having as a first input line one of the four microcontroller output lines and having as a second input line the ground current conductor. Each optoisolator device also has a collector, which is tied to line voltage through a current limiting resistor, and an emitter, which drives a triac device.

(i) Four triac devices are provided, each being associated with an optoisolator device. Each triac device is gated by the output of the associated optoisolator, and functions as a switch to regulate the supply of line current to an associated electrical outlet (j) Four electrical outlets, each associated with a triac device, are provided. Each outlet has the line connector attached the output of the triac, typically through a fuse. Each outlet also has the appropriate neutral and ground connections.

(k) A direct current power supply includes a step-down transformer, having 120 volts ac current as its input, and having an output that is input to a voltage regulator, which in turn supplies low voltage direct current to the microcontroller.

(l) A test circuit having a single test pushbutton and signal lamps associated with each outlet allows the user to distinguish between lack of power caused by a circuit failure such as a blown fuse and lack of power caused by the normal cycling of power on and off. The test circuit forces the operation of the optoisolators, and in turn the triacs, thereby supplying power to the outlets and to the test lamps. In the event that the test lamps do not operate, the user is notified that there is a failure somewhere in the power sharing device.

It is therefore a primary advantage of the present invention to provide a novel power sharing device having four switched outlets where power is cycled from one outlet to the next in evenly timed intervals, allowing four devices to be powered in sequence, thereby saving power and money and reducing the peak load and allowing as many as four vehicles to operate all of their automobile warming devices from a single standard 15 amp convenience outlet.

Another advantage of the present invention is to provide a power sharing device having a power cycle choice switch that allows the user to reduce power consumption a further 50% by choosing to have periods where the power is turned off between the periods in which power is cycled to each outlet in sequence.

Another advantage of the present invention is to provide a power sharing device having circuitry including a test pushbutton and four signal lamps that allows the user to distinguish between the absence of power due to the normal on and off cycling of power to the outlets and the absence of power due to a circuit failure.

Another advantage of the present invention is to provide a power sharing device having signal lamps associated with each outlet that indicate that power is present, and that care should therefore be taken.

A still further advantage of the present invention is to provide a power sharing device having a delay period choice switch that allows the user to choose the period of delay before the power cycling commences.

DRAWINGS

Figure 2:
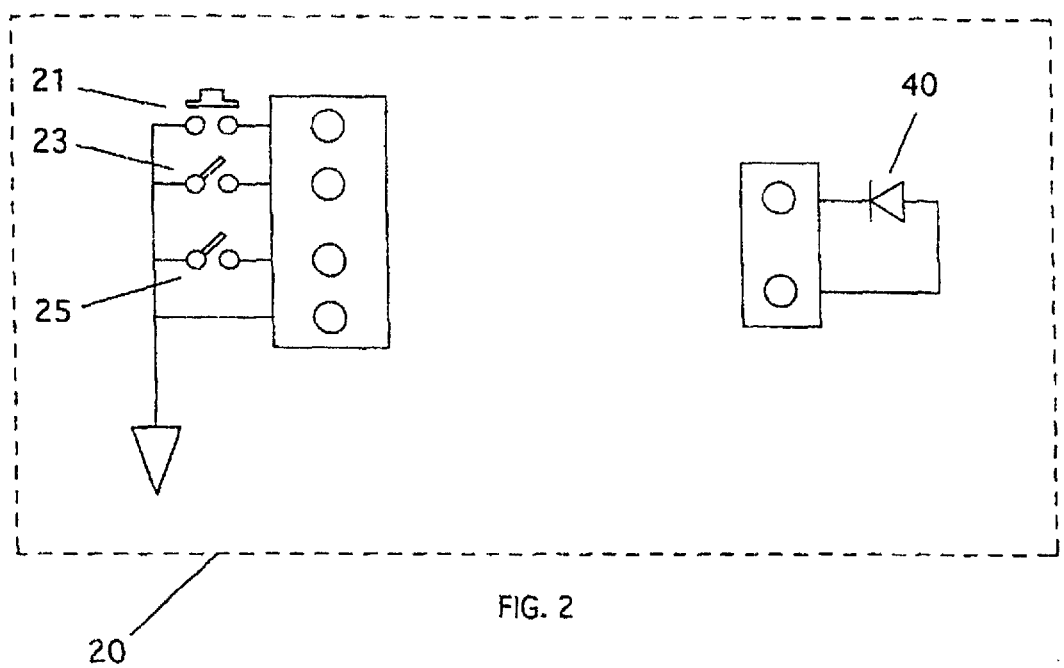

These and other features, aspects, and advantages of the present invention will become better understood with regard to the following description, appended claims, and accompanying drawings where:

FIG. 1 is circuit schematic showing a version of the electronics of the invention suited to cycle power between the four outlets shown; and FIG. 2 is a schematic showing the input switches and output LED on the control panel of the power sharing device.

DESCRIPTION

Referring to FIGS. 1 and 2, a power sharing device constructed in accordance with the principles of the invention is seen. Input switches on the control panel 20 allow the user to control the device's functionality. A microcontroller 30 provides the functionality needed to control the power cycling to the electrical outlets. Optoisolators 50 provide the isolation needed between the ac and dc portions of the circuit, and allow for the electrical outlets 70 to be switched on and off by controlling triac switching devices 60. An ac power plug 10 is of the standard type. A power supply 80 provides the dc power required by the microcontroller.

In a manner that is very well known and is seen in FIG. 1, a power supply 80 provides the low voltage direct current power required by the microcontroller 30. A step-down transformer 82 reduces the voltage of the incoming ac current. A fuse 81 protects the circuit from overload. A diode 83 prevents current flow in the reverse direction, while a voltage regulator 84 together with capacitors 85 produce a consistent low voltage direct current output.

As will be seen, a microcontroller 30 controls the functionality of the circuit. In the preferred embodiment, the microcontroller is a BASIC Stamp, model BS1-IC, a product of Parallax, Inc., of California, having telephone number (916) 624-8333.

A control panel 20 allows the user to select a desired operational mode. A power cycle choice switch 23 has one terminal attached to a resistor 24 and also to one of the microcontroller's port lines. A delay period choice switch 25 has one terminal attached to a resistor 26 and also to another of the microcontroller's port lines. A delay pushbutton 21 has one terminal attached to resistor 22 and also to another of the microcontroller's port lines. When switches 21, 23, 25 are open, the microcontroller's input port lines are high; when the switches are closed, the microcontroller's input port lines are low, and current is limited by the resistors 22, 24, 26.

The resistors 22, 24, 26 pull up the voltage potential of the delay period choice switch, the power cycle choice switch and the delay pushbutton switch, and therefore the associated inputs to the microcontroller seen in FIG. 1, when the switches are in the open state.

An LED indicator 40 having a current limiting resistor 41 is attached to one of the microcontroller's port lines, and enables the microcontroller to indicate that a delay period is in progress.

Also connected to the microcontroller's port lines through current limiting resistors 54, 55, 56, 57 are the anodes, or first inputs, of four optoisolators 50, 51, 52, 53. The optoisolators may be of a variety of types, such as the Motorola MOC 3010. The cathode, or second input, of each optoisolator is connected to ground. The collector of each optoisolator is connected to "line" or "hot" 120 volts ac power through current limiting resistors 64, 65, 66, 67. The emitter of each optoisolator is connected to the gate of each triac 60, 61, 62, 63, thereby controlling whether the triac is in a conducting state or a non-conducting state.

The output of each triac switching device 60, 61, 62, 63 is attached to the line terminal of each outlet 70, 71, 72, 73. When the triac is in a state that allows conduction, line voltage is applied to the outlets through four similar fuses 74 that are installed in-line between the output line of each triac switch and the line terminal of the electrical outlets.

In the preferred embodiment, the software controlling the microcontroller is written in a modified form of BASIC, which runs on the BASIC Stamp. In alternative embodiments of the invention, the software could be written in assembler code and run on a different microcontroller. In either case, the algorithm is similar.

The microcontroller executes an input statement upon power-up and at frequent intervals during all delay periods. By executing an input instruction, the microcontroller can determine whether the delay pushbutton 21 is being pressed, the setting of the power cycle choice switch 23 and the setting of the delay period choice switch 25. The results may be stored as a variable within the microcontroller. If the delay pushbutton is being pushed, the microcontroller reads the port to determine the correct delay period from the setting of the delay period choice switch 25 and the correct power cycle from the power cycle choice switch. The microcontroller then delays the onset of power cycling for the appropriate period of time, and then begins the appropriate power cycle.

The delay period choice switch 25 requires the microcontroller to time either a one hour or a two hour delay, before starting the power cycle. The appropriate delay is easily accomplished by means of timed loops.

The power cycle choice switch allows the user to choose between a first power cycle and a second power cycle. The first power cycle provides power for 15 minutes to a first outlet 70, followed by power for 15 minutes to a second outlet 71, followed by power for 15 minutes to a third outlet 72, followed by power for 15 minutes to a fourth outlet 73, followed by repetition of the above pattern. The second power cycle is similar, but provides only 7.5 minutes of power to each outlet, followed by a period of 7.5 minutes in which no power is supplied to any outlet. In all cases, the appropriate periods of time are easily measured by means of timed loops. A timed loop being a sequence of instructions executed by the microcontroller taking a known period of time to execute, thereby allowing larger periods of time to be measured by multiples of the timed loops. During these loops, the microcontroller must repeatedly poll the input port, to determine if the delay pushbutton is being activated by the user.

A simple loop or repeat statement causes the microcontroller to cycle indefinitely in a manner that causes the execution of either of the above power cycles. During the timed periods of the power cycles, power is turned on and off to the outlets by raising and lowering the output port lines tied to the optoisolators. Raising and lowering the output port lines is easily accomplished by outputting to a specific pin by means of program statements.

Because power is turned on and off to each outlet in a cyclical manner, it may be difficult to determine if the outlet is functioning properly or if power is currently turned on to an outlet. To indicate that an outlet is currently connected to ac power, a signal lamp 93 is associated with each outlet, and is lit when power is available at the outlet. Additionally, a test circuit activated by test pushbutton 90 causes power to be available to all outlets, therefore lighting all signal lamps 93, while the test pushbutton is being pushed. Thus, the test pushbutton overrides the microcontroller during those times when the microcontroller has turned ac power off to an outlet.

Referring to FIG. 1, it is seen that the test circuit provides a test pushbutton 90 having a first terminal and a second terminal. The first terminal is connected to the power supply and the second terminal is connected to the first input of each of the four optoisolators through a diode 92 and a current limiting resistor 91 associated with each optoisolator. Closing the pushbutton switch 90 therefore causes the anode or first input to each optoisolator to be raised to an elevated voltage potential, resulting in each triac supplying ac voltages to each outlet in the manner already discussed.

Continuing to refer to FIG. 1, each outlet 70, 71, 72, 73 is associated with a signal lamp 93 having a first terminal and a second terminal. The first terminal of each lamp is in electrical communication with the line or hot terminal of the electrical outlet and the second terminal is in electrical communication with the neutral terminal of the electrical outlet. Typically, a current limiting resistor 94 is installed between each signal lamp and the line terminal. It is important to note that the signal lamps should be installed between the fuse 74 and the outlets, so that if the fuse blows the signal lamps will not function.

To use the above described power sharing device, it is first plugged in. The heating cycle choice switch is set to either 7.5 or 15 minute periods. The delay period choice switch is then set to either 1 or 2 hours. If a delay period prior to the onset of the application of power to the four outlets is desired, the delay pushbutton is pressed, causing a delay commensurate with the setting of the delay period choice switch. As many as four electrical loads, typically automotive block heaters, battery heaters, radiator heaters or animal water heaters, are then plugged into outlets 70, 71, 72, 73. Following use, the loads are unplugged.

To use the test circuit, the user first observes the signal lamp 93. If it is on, then it is clear that power is being applied to the outlet. If the signal lamp is off, then the outlet may have failed, or alternatively, the microcontroller may have switched power off to that outlet. To distinguish between these alternatives, the user presses the test pushbutton switch 90 and observes the signal lamp 93. If it is lit then the reason power was not originally applied to the outlet is almost certainly related to the duty cycle of the shared power. If it does not light, then the user should inspect the fuse 74, make sure that plug 10 is plugged in, and check for other causes of circuit damage.

The previously described versions of the present invention have many advantages, including a primary advantage of providing a novel power sharing device having four switched outlets where power is cycled from one outlet to the next in evenly timed intervals, allowing four devices to be powered in sequence, thereby saving power and money and reducing the peak load.

Another advantage of the present invention is to provide a power sharing device having a power cycle choice switch that allows the user to reduce power consumption a further 50% by choosing to have periods where the power is turned off between the periods in which power is cycled to each outlet in sequence.

Another advantage of the present invention is to provide a power sharing device having circuitry including a test pushbutton that allows the user to distinguish between the absence of power due to the normal on/off cycling of power to the outlets and the absence of power due to a circuit failure.

A still further advantage of the present invention is to provide a power sharing device having a delay period choice switch that allows the user to choose the period of delay before the power cycling commences.

In compliance with the U.S. Patent Laws, the invention has been described in language more or less specific as to methodical features. The invention is not, however, limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A power sharing device, comprising:
   (a) a power cord, adapted to be inserted into a standard electrical outlet, thereby providing appropriate voltages to a line current conductor, a neutral current conductor and a ground current conductor;
   (b) delay period choice switch means for allowing the user to select an initial delay period, typically of either one hour or two hours;

(c) power cycle choice switch means for allowing the selection of a first or a second power cycle period;

(d) delay pushbutton switch means for initiating a delay period;

(e) power supply means, connected to the line and neutral conductors, for producing a regulated supply of low voltage direct current;

(f) microcontroller means, having at least 3 input and 4 output lines, attached to the regulated supply of low voltage direct current, where the three input lines are connected to the delay period choice switch, the power cycle choice switch and the delay pushbutton switch, for upon either power being applied to the microcontroller or activation of the delay pushbutton switch, checking to see the status of the delay period switch and the power cycle switch and for executing either a one hour or a two hour delay in response to the setting of the delay period switch, and for, following the delay, activating the output lines in sequence for either 15 minutes if the power cycle choice switch was set to a first setting or for activating the output lines in sequence for 7.5 minutes followed by a 7.5 minute period where no output line was activated if the power cycle choice switch was set to a second setting;

(g) four optoisolator means, each having as a first input one of the four output lines of the microcontroller and as a second input the ground current conductor, for isolating the microcontroller means from the line current conductor and for producing an output signal in response to the signal on the output line of the microcontroller;

(h) four triac switching means for electrically connecting and disconnecting an output line to the line current conductor, each triac associated with an optoisolator means, each triac switching means having as a first input a conductor attached to line current conductor and having as a second input the output signal of the associated optoisolator means; and (i) four electrical outlets, each outlet associated with one of the triac switching means, each outlet having a line terminal connected to the output line of the associated triac and having a neutral terminal connected to the neutral current conductor and having a ground terminal connected to the ground current conductor.

2. The power sharing device of claim 1, further comprising a test circuit, comprising:

(a) a test pushbutton switch having a first terminal and a second terminal, wherein the first terminal connected to the power supply and the second terminal is connected to the first input of each of the four optoisolators; and (b) a signal lamp associated with each of the four electrical outlets, each signal lamp having a first terminal and a second terminal, wherein the first terminal is in electrical communication with the line terminal of the electrical outlet and the second terminal is in electrical communication with the neutral terminal of the electrical outlet.

3. The power sharing device of claim 2, additionally comprising four current limiting resistors, one current limiting resistor between each of the four output lines of the microcontroller means and the first input of each of the optoisolators.

4. The power sharing device of claim 3, additionally comprising current limiting resistors in line between a collector of each optoisolator means and the line current conductor.

5. The power sharing device of claim 4, additionally comprising a fifth output line from the microcontroller, operatively attached to LED indicator means for indicating that the one hour delay or the two hour delay is in progress.

6. The power sharing device of claim 5, additionally comprising fuses, carried in line between the output line of each triac switching means and the line terminal of the electrical outlets.

7. A power sharing device, comprising:

(a) a power cord, adapted to be inserted into a standard electrical outlet, providing appropriate voltages to a line current conductor, a neutral current conductor and a ground current conductor;

(b) delay period choice switch means for allowing the user to select a delay period, typically of either one hour or two hours;

(c) power cycle choice switch means for allowing the selection of a first or a second power cycle period;

(d) delay pushbutton switch means for reseting the power sharing device;

(e) power supply means, connected to the line and neutral conductors, for producing a regulated supply of low voltage direct current;

(f) microcontroller means, having at least 3 input and 4 output lines, attached to the regulated supply of low voltage direct current, where the three input lines are connected to the delay period choice switch, the power cycle choice switch and the delay pushbutton switch, for upon either power being applied to the microcontroller or activation of the delay pushbutton switch, checking to see the status of the delay period switch and the power cycle switch and for executing either a one hour or a two hour delay in response to the setting of the delay period switch, and for, following the delay, activating the output lines in sequence for either 15 minutes if the power cycle choice switch was set to a first setting or for activating the output lines in sequence for 7.5 minutes followed by a 7.5 minute period where no output line was activated if the power cycle choice switch was set to a second setting;

(g) four optoisolator means, each having as a first input one of the four output lines of the microcontroller and as a second input the ground current conductor, for isolating the microcontroller means from the line current conductor and for producing an output signal in response to the signal on the output line of the microcontroller;

(h) four triac switching means for electrically connecting and disconnecting an output line to the line current conductor, each triac associated with an optoisolator means, each triac switching means having as a first input a conductor attached to line current conductor and having as a second input the output signal of the associated optoisolator means;

(i) four electrical outlets, each outlet associated with one of the triac switching means, each outlet having a line terminal connected to the output line of the associated triac and having a neutral terminal connected to the neutral current conductor and having a ground terminal connected to the ground current conductor, (j) pull up resistor means, attached to the power supply means, for pulling up the voltage potential of the delay period choice switch, the power cycle choice switch and the delay pushbutton switch when the switches are in the open state;

(k) four current limiting resistors, one current limiting resistor between each of the four output lines of the microcontroller means and the first input of each of the optoisolators;

(l) current limiting resistors in line between a base of each optoisolator means and the line current conductor;

(m) a fifth output line from the microcontroller, operatively attached to LED indicator means for indicating that the one hour delay or the two hour delay is in progress;

(n) fuses, carried in line between the output line of each triac switching means and the line terminal of the associated electrical outlet; and (o) a test circuit, comprising:
  (a) a test pushbutton switch having a first terminal and a second terminal, wherein the first terminal connected to the power supply means and the second terminal is connected to the first input of each of the four optoisolators; and
  (b) a signal lamp associated with each of the four electrical outlets, each signal lamp having a first terminal and a second terminal, wherein the first terminal is in electrical communication with the line terminal of the electrical outlet and the second terminal is in electrical communication with the neutral terminal of the electrical outlet.

* * * * *